(12) United States Patent
Thirunarayan et al.

(10) Patent No.: US 7,145,271 B2
(45) Date of Patent: Dec. 5, 2006

(54) HIGH PERFORMANCE LINEAR MOTOR AND MAGNET ASSEMBLY THEREFOR

(75) Inventors: Nandakumar Thirunarayan, Saint James, NY (US); James F. Smith, Smithtown, NY (US)

(73) Assignee: Anorad Corporation, Shirley, NY (US)

( * ) Notice: Subject to any disclaimer, the term of this patent is extended or adjusted under 35 U.S.C. 154(b) by 0 days.

(21) Appl. No.: 11/151,152

(22) Filed: Jun. 13, 2005

(65) Prior Publication Data
US 2006/0138872 A1    Jun. 29, 2006

Related U.S. Application Data

(62) Division of application No. 10/889,384, filed on Jul. 12, 2004, now Pat. No. 6,919,653, which is a division of application No. 10/369,161, filed on Sep. 19, 2003, now Pat. No. 6,803,682.

(60) Provisional application No. 60/358,654, filed on Feb. 21, 2002.

(51) Int. Cl.
*H02K 41/00* (2006.01)
(52) U.S. Cl. .............................. 310/12; 310/15; 310/13; 310/14; 310/23; 310/27
(58) Field of Classification Search .................. 310/12, 310/15, 13, 14, 23, 27
See application file for complete search history.

(56) References Cited

U.S. PATENT DOCUMENTS 5,734,209 A  *  3/1998  Hallidy ......................... 310/12
6,016,021 A  *  1/2000  Hinds .......................... 310/12
6,097,114 A       8/2000  Hazelton
6,380,661 B1 *  4/2002  Henderson et al. ..... 310/323.02
6,455,957 B1     9/2002  Chitayat
6,803,682 B1 * 10/2004  Thirunarayan et al. ....... 310/12
6,919,653 B1 *  7/2005  Thirunarayan et al. ....... 310/12

FOREIGN PATENT DOCUMENTS

JP    2001145328 A    5/2001
JP    2001197717 A    7/2001

OTHER PUBLICATIONS

James R. Hendershot, et al. "Design of Brushless Permanent-Magnet Motors", Dec. 1994, vol. 37, Oxford University Press.

* cited by examiner

*Primary Examiner*—Darren Schuberg
*Assistant Examiner*—Iraj A. Mohandesi
(74) *Attorney, Agent, or Firm*—Amin Turocy & Calvin LLP; Alexander R. Kuszewski

(57) ABSTRACT

A magnet assembly includes a back iron and an array of magnets. The back iron is in the form of a plate having opposed surfaces. The magnets are arranged along one of the surfaces, with the other surface being dimensioned and configured according to the magnetic field distribution associated with the magnets. The back iron geometry provides for reduced mass, reduced leakage flux, and high flux densities to improve performance of a linear motor that employs such a magnet assembly.

6 Claims, 4 Drawing Sheets

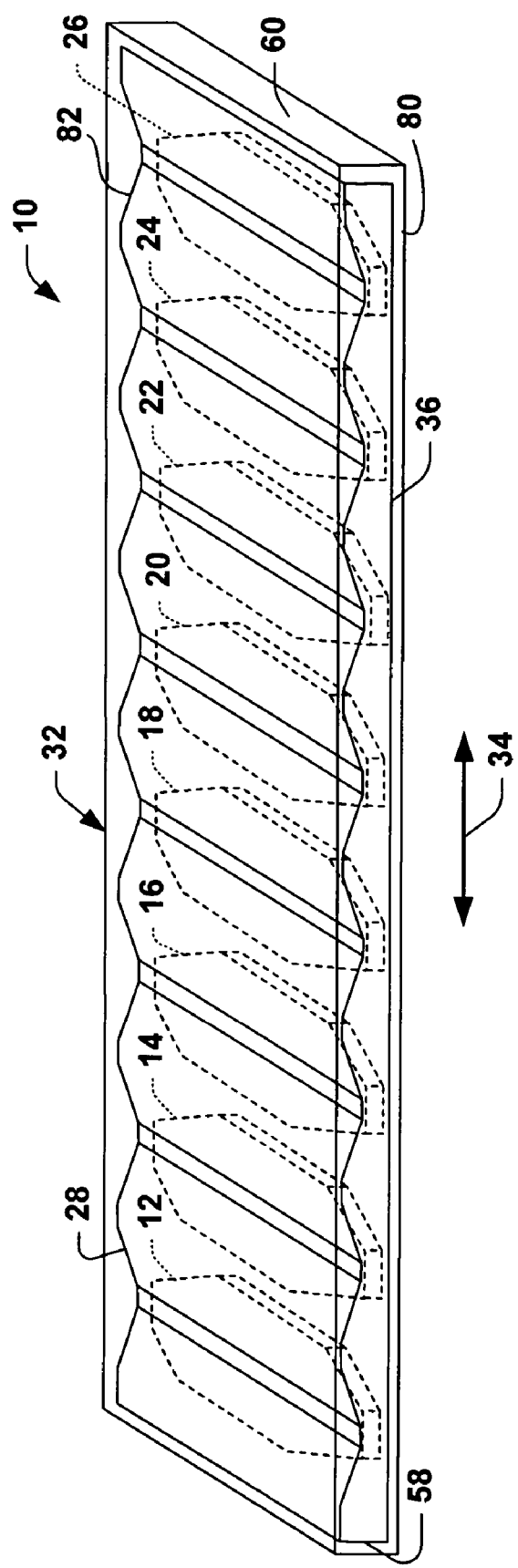

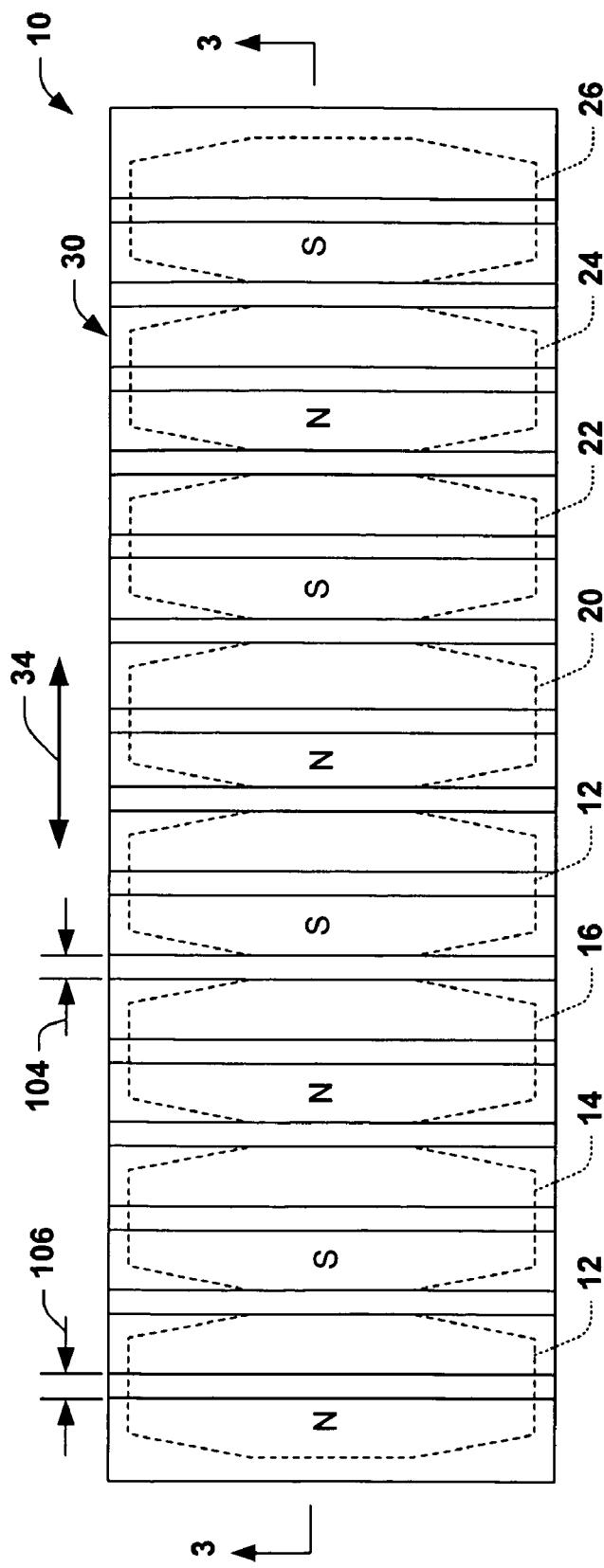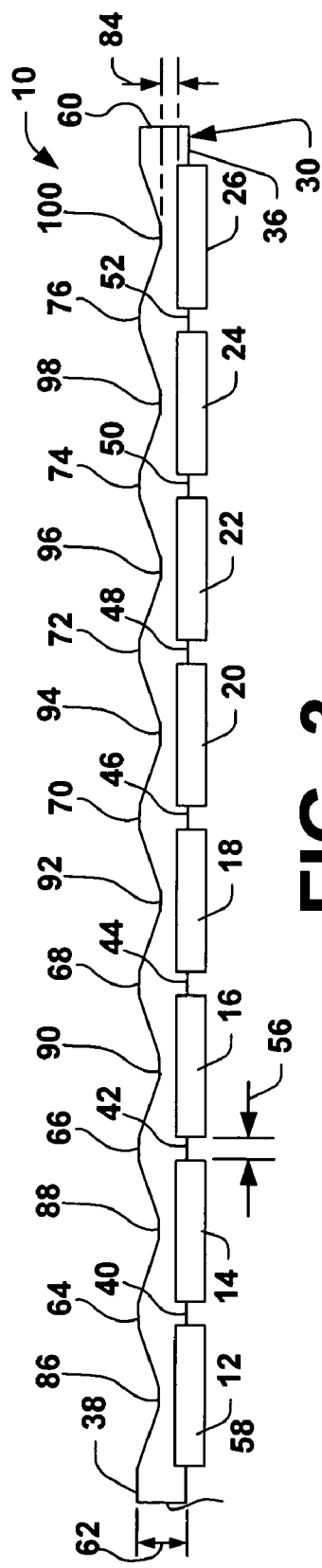

HIGH PERFORMANCE LINEAR MOTOR AND MAGNET ASSEMBLY THEREFOR

REFERENCE TO RELATED APPLICATIONS

This is a divisional application of U.S. patent application Ser. No. 10/889,384, filed Jul. 12, 2004, now U.S. Pat. No. 6,919,653, entitled HIGH PERFORMANCE LINEAR MOTOR AND MAGNET ASSEMBLY THEREFOR, which is a divisional application of U.S. patent application Ser. No. 10/369,161, filed Feb. 19, 2003, now U.S. Pat. No. 6,803,682, entitled HIGH PERFORMANCE LINEAR MOTOR AND MAGNET ASSEMBLY THEREFOR, which claims the benefit of U.S. Provisional Patent Application Ser. No. 60/358,654, filed on Feb. 21, 2002, and entitled HIGH PERFORMANCE LINEAR MOTOR MAGNET ASSEMBLY THEREFOR. The entireties of these applications are incorporated by reference herein.

BACKGROUND OF THE INVENTION

Linear motors are used in various types of systems, such as for positioning and moving applications, including machining and gantry type systems. The high performance systems often require moving elements subjected to high acceleration levels. In order to achieve such high acceleration, the linear motor must exert large forces upon the elements to be moved.

There are various configurations of linear motors, including flat motors, U-channel motors and tubular shaped motors. Different types of linear motors are also available, including brush, AC brushless, stepper, and induction motors. Common to most linear motors is a moving assembly, usually called a forcer or stage, which moves relative to a stationary platen (or path) according to magnetic fields generated by application of current through one or more associated windings. The windings can be on the forcer or at the platen depending on the type of motor. For example, in a permanent magnet linear motor, a series of armature windings can be mounted within a forcer that is movable relative a stationary path. The path can include an array of permanent magnets configured to interact with the coils in the stage when energized with an excitation current.

Alternatively, in another type of conventional linear motor, permanent magnets can be part of a moveable stage with the coils situated in the platen. Usually, the permanent magnets are attached to a back iron plate above the coils, which are oriented along a path of travel. The magnets usually are rectangular in shape. The magnets are arranged along the back iron so that adjacent pairs of magnets have opposite magnetic pole orientations. The magnets can be oriented generally normal to the direction of travel or inclined at a slight angle from normal to an axis of the direction of travel for the linear motor. The inclined angle creates a flux distribution along the axis of movement which is generally sinusoidal in nature. Such a resulting distribution due to the optimized motor geometry tends to reduce cogging during operation of the linear motor, which would otherwise occur if the magnets were aligned, normal to the axis of movement.

Although an inclined angle of the magnets can reduce some cogging, it presents a disadvantage in that a larger area typically must be covered by the rectangular magnets in order to sufficiently cover and interact with the coils of the armature. When the magnets are implemented with a larger area so as to reduce cogging effects, a larger footprint for the back iron also is required. This tends to increase the overall weight and size of the stage. Such increases in size and weight can present additional obstacles, such as in applications were there are size constraints and low mass is desirable. For example, as the mass of the stage increases, the available acceleration experiences a corresponding reduction, and the ability to stop the motor accurately also reduces because of the increased power dissipation needed to stop the motor.

As the use of linear motors in manufacturing equipment continues to increase, nominal increases in the speed of operation translate into significant savings in the cost of production. Accordingly, it is desirable to provide a magnet assembly that can be part of a high performance linear motor.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a magnet assembly that can be employed as part of a linear motor stage to form a high performance linear motor. The magnet assembly includes a plurality of magnets operatively associated with magnetically conductive plate, commonly known as a back iron. The magnets extend from a common side of the back iron. The back iron is dimensioned and configured to substantially conform to magnetic flux that travels through the back iron when the magnet assembly is exposed to a magnetic field, such as from windings of a motor path. In one particular aspect of the present invention, a cross-sectional dimension of the back iron varies between opposed ends of the back iron as a function of the position and/or orientation of the magnets. For example, a thickness of the back iron is greater at locations between adjacent pairs of the magnets than at locations generally centered with the respective magnets. As a result of such back iron geometry, force output to moving mass ratio of a motor incorporating the magnet assembly is improved over conventional configurations of magnet assemblies. Also, the back iron geometry reduces leakage flux.

Another aspect of the present invention provides a linear motor system that includes a path having a plurality of windings, which can be energized to produce desired magnetic fields. The linear motor system also includes a magnet assembly, such as described above. The linear motor system achieves high performance because the magnet assembly has a reduced mass, which substantially conforms to magnet flux lines that travel through the magnet assembly during energization of path windings. The mass further can be reduced by employing generally elongated octagonal magnets, such as by removing corner portions from rectangular magnets.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents.

Other advantages and novel features of the invention will become apparent from the following detailed description of the invention when considered in conjunction with the drawings.

BRIEF DESCRIPTION OF THE DRAWINGS

FIG. 1 is an isometric view of a moving magnet assembly in accordance with an aspect of the present invention.

FIG. 2 is a top elevation of the magnet assembly of FIG. 1.

FIG. 3 is a side sectional view of the magnet assembly taken along line 3—3 of FIG. 2.

DETAILED DESCRIPTION OF THE INVENTION

Figure 4:
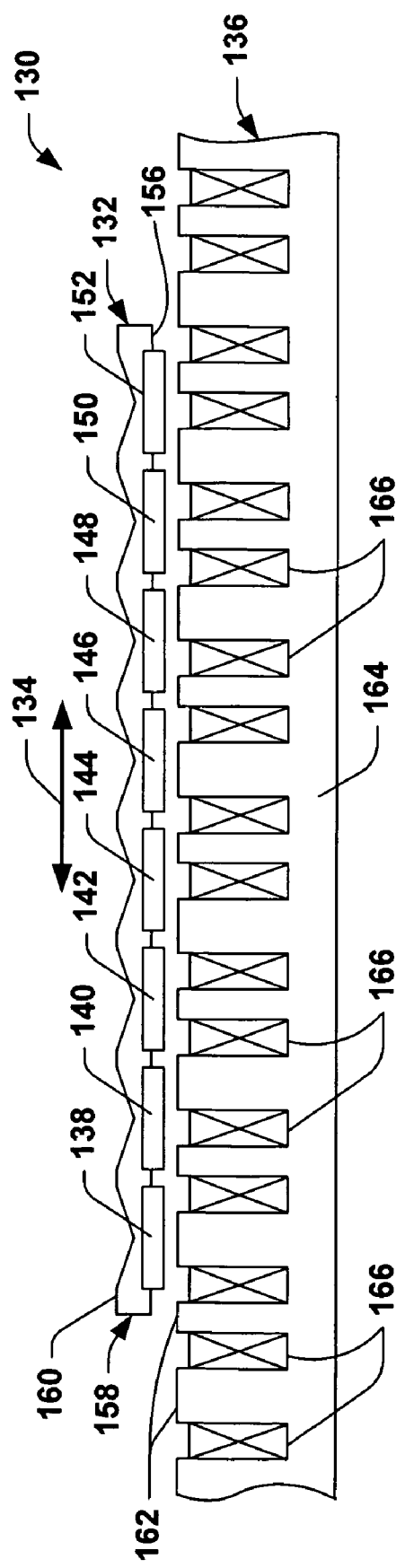
FIG. 4 is side sectional view of part of a linear motor in accordance with an aspect of the present invention.

The present invention provides a magnet assembly for use in a linear motor. The magnet assembly includes a back iron and an array of magnets. The back iron is in the form of a plate having opposed surfaces of the back iron. The magnets are arranged in a generally linear array along one of the surfaces. The other surface of the back iron plate is dimensioned and configured according to the magnetic field distribution and/or localized regions of saturation associated with the motor geometry/topology. For example, the surface of the back iron plate opposite to which the magnets are attached can be scalloped, such that a dimension between the opposed surfaces at locations generally aligned with the magnet centers is less than a dimension between the opposed surfaces at locations between adjacent magnets.

FIGS. 1, 2 and 3 illustrate a magnet assembly 10 in accordance with an aspect of the present invention. The magnet assembly 10 includes an array of permanent magnets 12, 14, 16, 18, 20, 22, 24, and 26 of alternating magnetic polarity (see FIG. 2). The magnets 12–26 are arranged in a substantially parallel relationship to each other and mounted to a generally rigid and magnetically conductive plate 30, commonly referred to (and hereinafter referred to) as a back iron. The alternating polarity facilitates the flow of magnetic flux through the magnets 12–26 and the back iron 30. The assembly 10 also includes an outer encapsulation 32 of a suitable non-conducting material, such as an epoxy or a polymer material. The encapsulation 32 helps hold the magnets 12–26 and back iron 30 in a desired relationship.

FIG. 2 is a top elevation of the magnet assembly of FIG. 1 in which the encapsulation 32 has been removed. As shown in FIG. 2, the magnets 12–26 have a generally rectangular geometry and are spaced apart from each other by a predetermined distance. The magnets 12–26 have long axes, which are oriented generally perpendicular to a desired direction of travel for the assembly 10, indicated at 34, and which are aligned substantially parallel to each other. To provide desired flux distribution, the corners of each of the magnets 12–26 have been chamfered to form magnets having elongated octagonal geometries, such as shown in FIG. 2. The precise configuration can vary depending on the size of the magnets 12–26, the size of the motor in which the assembly is to be employed as well as the desired characteristics for the motor. In this example, the illustrated magnet geometry also helps reduce the mass of the magnet assembly 10. By way of example, the magnets are formed of a NdFeB material or other type of high performance permanent magnetic materials.

Referring to the side-sectional view of FIG. 3, the 12–26 magnets are mounted to and extend from a common side 36 of the back iron 30. The back iron 30 also includes another side 38 opposite the side 36 to which the magnets 12–26 are mounted. In particular, the magnets 12–26 are position in slots or receptacles on the side 36, which are dimensioned and configured to receive a portion of the respective magnets therein. Adjacent pairs of the slots define notches 40, 42, 44, 46, 48, 50, and 52 of the back iron material that extend between adjacent pairs of magnets. The notches 40–52 operate to separate adjacent pairs of the magnets 12–26 by a predetermined distance, indicated at 56, which corresponds to the width of the respective notches. For example, less than one-half the width of the magnets 12–26 are recessed into the back iron 30, such that more than one-half the width of the magnets extend outwardly from the side 36 of the back iron 30. The notches 40–52 and remaining surface of the side 36 are generally coplanar, although other shapes and configurations could be used in accordance with an aspect of the present invention. Also, the notches 40–52 act as retainers locking the magnets in place providing the desired stiffness.

In accordance with an aspect of the present invention, a cross-sectional dimension of the back iron 30 varies along its length between spaced apart ends 58 and 60 so as to substantially conform to the magnetic flux generated during operation of a motor that includes the magnet assembly 10. In the example of FIG. 3, the thickness of the back iron 30 between the opposed sides 36 and 38 is greater at locations between adjacent pairs of the magnets 12–26 than at locations generally aligned with centers of the respective magnets. The back iron 30 can be formed of substantially any generally rigid material capable of conducting a magnetic field, so as to help form a magnetic circuit formed of the magnets 12–26 of different polarities and associated motor windings (not shown).

For example, the back iron 30 is formed of a non-linear material having a high magnetic permeability and desired saturation characteristics. In a particular aspect of the present invention, the back iron is formed of vanadium permeadur (e.g., cobalt—48.75%, Vanadium—2%, Carbon—0.004%, Manganese—0.05%, Silicon—0.05%, Iron—balance), which has particularly high saturation characteristics compared to other non-linear materials. While such material is considerably more expensive than steel, its superior magnetic properties are desirable in ultra-high performance motors according to the present invention. It is to be understood and appreciated that a high performance magnet assembly, in accordance with an aspect of the present invention, could employ other types of non-linear materials (e.g., M19 steel) than vanadium permeadur.

By way of illustration, the back iron 30 has a maximum thickness, indicated at 62, at its ends 40 and 42 and at locations 64, 66, 68, 70, 72, 74, and 76 between adjacent pairs of magnets 12–26. In the example of FIG. 3, the locations 64–76 having the maximum thickness 62 are substantially coextensive with the notches 40–52. Additionally, the side 38 of the back iron 30 at the ends 58 and 60 and at the locations 64–76 are generally coplanar and substantially parallel to the other side 36 of the back iron. It is to be appreciated, however, that back iron other shapes (e.g., curved in the direction of travel) also could utilized in accordance with an aspect of the present invention. Thus, as shown in FIGS. 1 and 2, the side 38 defines generally rectangular and coplanar strips extend between side edges 80 and 82 of the back iron 30 at the ends 58 and 60 and at the locations 64–76.

The back iron 30 further has a minimum thickness, indicated at 84, at locations 86, 88, 90, 92, 94, 96, 98, and 100 substantially centered with the long axes of the respective magnets 12–26. In the example of FIG. 3, the locations 86–100 have the minimum thickness 84, which define generally rectangular planes or strips in the side surface 38 spaced from and substantially parallel to the magnets 12–26 over which the respective locations are positioned. The locations generally rectangular strips, which can be coplanar, extend between the side edges 80 and 82 of the back iron 30.

The portions of the side 38 extending between the locations of maximum thickness (e.g., the ends 58 and 60 and the locations 64–76) and the locations of minimum thickness 86–100 slope upwardly and downwardly to provide a desired scalloped or sawtooth cross section, as illustrated in FIG. 3. That is, the locations (or strips) 64–76 and 86–100 respectively provide alternating peaks and valleys along the surface 38 of the back iron.

Referring to FIG. 2, each of the locations 64–76 of maximum back iron thickness has a width 104 in the direction 34, which width is greater than or equal to zero. Similarly, each of the locations 86–100 of minimum back iron thickness has a width 106 in the direction 34, which width is greater than or equal to zero. Accordingly, while the locations of maximum and minimum thickness are illustrated as generally planar and parallel to the side 36, those skilled in the art will understand and appreciated that virtually any widths 104 and 106 can be employed to provide different varying cross-sectional configurations for the back iron in accordance with an aspect of the present invention. Additionally or alternatively, while the locations 64–76, the locations 86–100 and the portion of the side surface extending therebetween are illustrated as generally planar surfaces, it is to be appreciated that one or more of such surface portions could be curved in accordance with an aspect of the present invention.

FIG. 4 illustrates a cross-sectional view of a linear motor system 130 in accordance with an aspect of the present invention. The system 130 includes a moving magnet assembly (or stage) 132 that is moveable in a direction of travel, indicated at 134, relative to a path 136. For example, the magnet assembly 132 is supported relative to the path 136 for movement in the direction 134, such as by low or no friction bearings (e.g., air bearings, not shown) to provide a desired air gap between the magnet assembly and the path.

The magnet assembly 132 includes a plurality of magnets 138, 140, 142, 144, 146, 148, 150, and 152, which are attached to and extend from a common side 156 of a back iron 158. An opposite side 160 of the back iron 158 is dimensioned and configured to conform to flux lines of a magnetic circuit formed between the magnet assembly and the path when the path is energized. That is, the thickness of the back iron 158 between the opposed sides 156 and 160 is greater at locations between adjacent pairs of the magnets 12–26 than at locations generally aligned with centers of the respective magnets. As a result, the side surface 160 has a generally scalloped or ribbed appearance between its ends; e.g., it is formed of alternating peaks and valleys between spaced apart ends of the back iron. The particular cross-sectional configuration of the back iron can vary, such as described herein.

The path 136 includes a plurality of spaced apart teeth 162 that extend from a base portion 164 toward the magnet assembly 132 located above the path 136. Typically, the teeth 162 are oriented substantially parallel relative to each other and to the magnets 138–152. The path 136 also includes windings 166 disposed around selected teeth. The windings 166 could be pre-wound coil assemblies or wound in-situ around the teeth 162.

Those skilled in the art will understand and appreciate that the linear motor system typically includes a motor controller programmed and/or configured to control operation of the motor system 130. For example, an encoder or other positioning system provides the controller with position information, based on which the controller controls energization of the associated windings 166 to effect desired movement of the magnet assembly 132 relative to the path. Those skilled in the art further will understand and appreciate various configurations of paths 136 and coil windings that could be utilized in combination with a magnet assembly in accordance with an aspect of the present invention.

Figure 5:
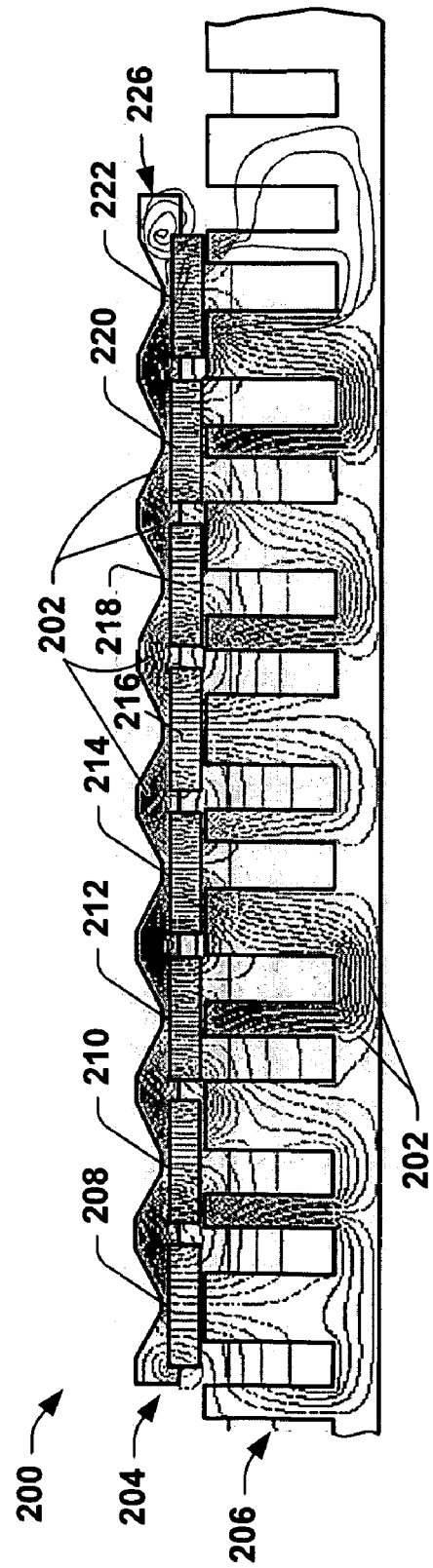
FIG. 5 is a side sectional view similar to FIG. 4, illustrating magnetic flux lines for an energized linear motor in accordance with an aspect of the present invention.

FIG. 5 depicts a graphical representation of part of linear motor system 200, similar to that shown in FIG. 4, illustrating magnetic flux lines 202 for magnet circuits formed by a magnet assembly 204 and energized windings of a motor path 206 in accordance with an aspect of the present invention. The magnet assembly 204 includes a plurality of permanent magnets 208, 210, 212, 214, 216, 218, 220, and 222 that are operatively coupled to a back iron 226.

In accordance with an aspect of the present invention, as shown in FIG. 5, the back iron 226 is dimensioned and configured to conform to the magnet flux lines that travel through the magnetic circuits formed of the magnet assembly and the path 206. The back iron 226 has a greater cross-sectional dimension at locations at ends of the magnet assembly 204 and between adjacent pairs of magnets than at the locations generally centered with the respective magnets. Consequently, the overall mass of the moveable magnet assembly 204 is less than if such portions had not been removed. Additionally, because the selected portions have been removed according to the magnetic flux lines during energization of the path windings, the forces generated between the assembly 204 and the path remain substantially unchanged from a back plane that would include a substantially planar surface opposite the magnets.

To further reduce the mass of the magnet assembly, the magnets can be configured to have chamfered corners, so as to provide a generally elongated octagonal geometry. The particular dimensions and configuration of magnets and back iron can be further optimized based on magnetic finite element analysis. As a result, under Newton's law, the acceleration of the magnet assembly 204 relative to the path 206 is increased by an amount proportional to the reduced mass of the magnet assembly. Additionally, the geometry further provides flux distribution that is substantially sinusoidal distribution, which mitigates total harmonic distortion (THD). A lower THD corresponds to a more efficient motor.

As mentioned above, it is to be appreciated that various configurations of magnet assemblies can be implemented in accordance with an aspect of the present invention. FIGS. 6–9 illustrate some examples of other configurations of magnet assemblies that can be utilized. It will be understood and appreciated that such examples are solely for illustrative purposes and that numerous other possible configurations exist, all of which are within the scope of the appended claims.

Figure 6:
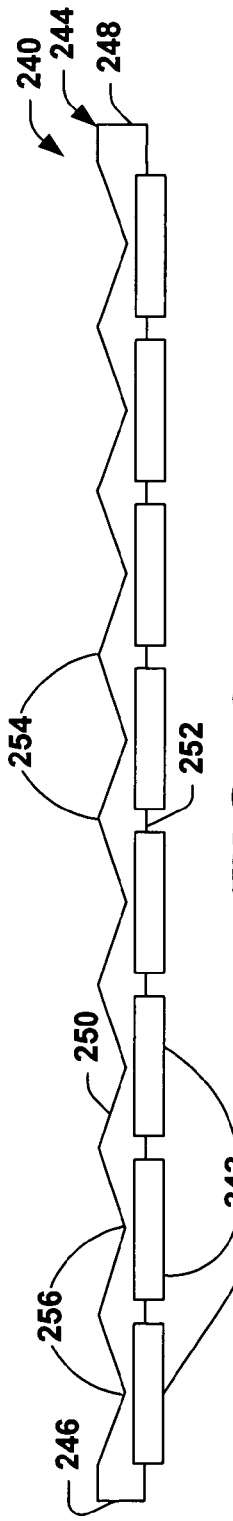
FIG. 6 is a side sectional view of a motor magnet assembly in accordance with another aspect of the present invention.

FIG. 6 illustrates a magnet assembly 240 for use in a linear motor in accordance with an aspect of the present invention. The assembly 240 includes a plurality of elongated permanent magnets 242 operatively coupled to a back iron 244. As shown in FIG. 6, a cross-sectional dimension of the back iron 244 varies along its length between spaced apart end portions 246 and 248 of the back iron. In particular, a side surface 250 of the back iron 244 opposite a side 252 to which the magnets 242 are attached has a substantially triangular or sawtooth geometry having alternating peaks 254 and valleys 256. The other side 252 is generally planar, although it includes slots or receptacles in which a portion of the respective magnets 242 is received. As a result of such back iron 244 configuration, the thickness of the back iron at locations between adjacent pairs of magnets 242 and at the end portions 246 and 248 is greater than its thickness at locations generally centered with the long axes of the respective magnets.

The geometry of the back iron 244 substantially conforms to magnetic flux lines that travel through the back iron from the magnets so as to provide extremely high flux densities. The geometry further enables the back iron 244 to have a reduced mass. The magnets also can be configured to have chamfered corners, so as to provide a generally elongated octagonal geometry, such that the mass of the magnet assembly is further reduced. The combination of high flux densities and reduce back iron mass result in a high performance motor capable of achieving rapid acceleration compared to conventional linear motors of similar size.

Figure 7:
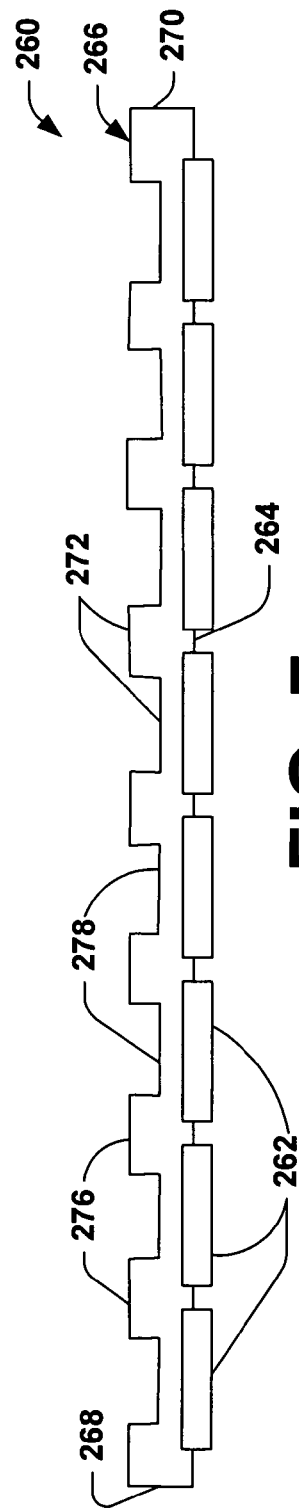
FIG. 7 is a side sectional view of a motor magnet assembly in accordance with another aspect of the present invention.

FIG. 7 illustrates a magnet assembly 260 for use in a linear motor in accordance with another aspect of the present invention. The assembly 260 includes a plurality of elongated permanent magnets 262 operatively coupled at a side surface 264 of a back iron 266. The back iron 266 has a cross-sectional dimension that varies along its length between spaced apart end portions 268 and 270 in accordance with an aspect of the present invention. In particular, a side surface 272 of the back iron 244 opposite the side 264 to which the magnets 262 are attached has a plurality of substantially elongated rectangular peaks (or protrusions) 276. The peaks 276 extend between side edges of the back iron. That is, the side 272 has alternating rectangular peaks 276 and valleys 278 to provide a generally square wave cross-sectional geometry between the end portions 268 and 270. The peaks 276 are generally centered over spaces between adjacent pairs of the magnets 262 and the valleys are generally centered over the long axes of the respective magnets. The side 264 is generally planar, although it includes slots or receptacles in which a portion of the respective magnets 262 is received.

As a result of such geometry for the back iron 266, the thickness of the back iron at locations between adjacent pairs of magnets 262 and at the end portions 268 and 270 is greater than its thickness at locations generally centered with the magnets. This geometry substantially conforms to magnetic flux lines that travel through the back iron 266 from the magnets 262 so as to provide extremely high flux densities, such as when associated windings of a motor incorporating the magnet assembly 260 are energized. The geometry further enables the back iron 266 to have a reduced mass. The combination of high flux densities and reduced back iron mass result in a high performance motor capable of achieving rapid acceleration compared to conventional linear motors of similar size.

Figure 8:
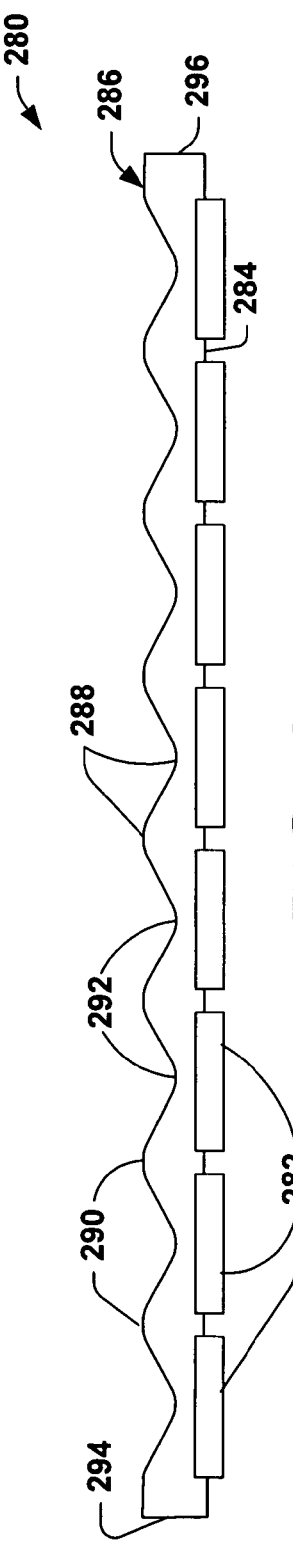
FIG. 8 is a side sectional view of a motor magnet assembly in accordance with another aspect of the present invention.

FIG. 8 depicts yet another magnet assembly 280 in accordance with an aspect of the present invention. The magnet assembly includes a plurality of permanent magnets 282 operative connected to a generally planar side surface 284 of a back iron 286. Specifically, a portion of the magnets 282 can be received in associated slots or receptacles formed in the side 284, although the magnets could be attached to the back iron in the absence of such slots.

In accordance with an aspect of the present invention, a side surface 288 of the back iron 286 opposite the side 284 to which the magnets are connected is dimensioned and configured to substantially conform to magnetic flux lines associated with the magnet assembly when exposed to magnetic fields from energized windings of an associated motor path (not shown). In the example of FIG. 8, the side surface 288 has alternating peaks 290 and valleys 292 to provide a generally sinusoidal cross-sectional configuration between spaced apart end portions 294 and 296 of the back iron 286. The peaks 290 are generally centered over spaces located between adjacent pairs of magnets 282 and the valleys 292 are generally centered over corresponding centers of the respective magnets.

As a result of the back iron geometry shown in FIG. 8, the magnet assembly 280 is able complete magnetic circuits in an associated linear motor so as to provide extremely high flux densities, such as when associated windings of the motor incorporating the magnet assembly are energized. The geometry further provides the back iron 286 with a reduced mass. To further reduce the mass of the magnet assembly, the magnets 282 can be configured as a generally elongated octagon, such as by removing corner portions of the magnets. The combination of high flux densities and reduced back iron mass result in a high performance motor capable of achieving rapid acceleration compared to conventional linear motors of similar size.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, a magnet assembly, in accordance with an aspect of the present invention can have different numbers of magnets from that shown and described herein. Additionally, the magnet assembly can have a different contour from the substantially flat configuration shown herein, such as to conform to the contour of the path with which the magnet assembly is to be utilized. Accordingly, the present invention is intended to embrace all such alterations, modifications and variations that fall within the spirit and scope of the appended claims.

What is claimed is:

1. A system that facilitates reducing leakage flux in a back iron, comprising:
   a plurality of magnets assembled with a gap between each pair of magnets and along an axis on a common side of the back iron;
   the back iron is dimensioned and configured to substantially conform to magnetic flux that travels through the back iron when the plurality of magnets is exposed to a magnetic field wherein a back iron second side has a cross-sectional configuration that has a plurality of alternating peaks and valleys, wherein at least a substantial number of peaks are generally aligned with gaps between adjacent pairs of magnets and the valleys are generally aligned with centers of respective magnets.

2. The system of claim 1, the back iron and plurality of magnets is integrated into a linear motor.

3. The system of claim 1, the back iron has a thickness that is greater at locations between adjacent pairs of the magnets than at locations generally centered with the magnets.

4. The system of claim 1, the back iron has a plurality of receptacles on the common side to receive the plurality of magnets.

5. The system of claim 1, the back iron has a second side opposite the common side with the magnets, the second side has a generally triangular or saw tooth cross-sectional geometry.

6. The system of claim 1, the back iron has a second side opposite the common side with the magnets, the second side has a generally sinusoidal cross-sectional geometry.

* * * * *